(12) United States Patent
Baker

(10) Patent No.: US 6,584,764 B2
(45) Date of Patent: Jul. 1, 2003

(54) PROPULSION MODULE

(75) Inventor: Von David Baker, Indianapolis, IN (US)

(73) Assignee: Allison Advanced Development Company, Indianapolis, IN (US)

(*) Notice: Subject to any disclaimer, the term of this patent is extended or adjusted under 35 U.S.C. 154(b) by 0 days.

(21) Appl. No.: 09/759,933

(22) Filed: Jan. 12, 2001

(65) Prior Publication Data
US 2003/0029162 A1 Feb. 13, 2003

Related U.S. Application Data
(60) Provisional application No. 60/175,808, filed on Jan. 12, 2000.

(51) Int. Cl.$^7$ ................................................ F02K 7/02
(52) U.S. Cl. ........................ 60/247; 137/15.1; 244/53 B
(58) Field of Search ............................... 137/15.1, 15.2; 60/247; 244/53 B

(56) References Cited

U.S. PATENT DOCUMENTS

| | | | |
|---|---|---|---|
| 1,980,266 A | 11/1934 | Goodard | |
| 2,523,308 A | 9/1950 | Kemmer et al. | |
| 2,612,748 A | 10/1952 | Tenney et al. | |
| 2,738,147 A | 3/1956 | Leech | |
| 2,740,254 A | 4/1956 | Ballauer et al. | |
| 2,750,733 A | 6/1956 | Paris et al. | |
| 2,757,509 A | 8/1956 | Jendrassik | |
| 2,970,745 A | * 2/1961 | Berchtold | 230/69 |
| 3,011,487 A | 12/1961 | Berchtold | |
| 3,109,580 A | 11/1963 | Kentfield | |
| 3,332,236 A | 7/1967 | Kunsagi | |
| 3,336,753 A | 8/1967 | Mullen, II et al. | |
| 3,417,564 A | 12/1968 | Call | |
| 3,659,424 A | 5/1972 | Polk, Jr. | |
| 3,702,632 A | 11/1972 | Grimshaw | |
| 3,774,868 A | 11/1973 | Goetz | |
| 3,848,408 A | 11/1974 | Tompkins | |
| 4,012,902 A | 3/1977 | Schirmer | |
| 4,098,076 A | 7/1978 | Young et al. | |
| 4,121,606 A | 10/1978 | Holland et al. | |
| 4,241,576 A | 12/1980 | Gertz | |
| 4,241,876 A | 12/1980 | Pedersen | |
| 4,327,886 A | 5/1982 | Bell et al. | |
| 4,369,940 A | 1/1983 | Kelly et al. | |
| 4,627,586 A | 12/1986 | Krumins et al. | |
| 4,771,601 A | 9/1988 | Spies | |
| 4,778,109 A | 10/1988 | Jourdain et al. | |
| 4,878,617 A | 11/1989 | Novotny | |
| 4,938,021 A | 7/1990 | Jones et al. | |
| 4,964,339 A | 10/1990 | Bastian et al. | |
| 4,992,039 A | 2/1991 | Lockwood, Jr. | |
| 5,081,835 A | 1/1992 | Ewing, Jr. | |
| 5,082,181 A | 1/1992 | Brees et al. | |
| 5,165,228 A | 11/1992 | Enderle | |
| 5,267,432 A | * 12/1993 | Paxson | 60/39.45 |
| 5,345,758 A | 9/1994 | Bussing | |
| 5,353,588 A | 10/1994 | Richard | |
| 5,513,489 A | 5/1996 | Bussing | |
| 5,615,548 A | 4/1997 | Winfree et al. | |
| 5,690,280 A | 11/1997 | Holowach et al. | |
| 5,699,966 A | 12/1997 | Beverage | |
| 5,806,791 A | 9/1998 | Hatalsky et al. | |
| 5,873,240 A | 2/1999 | Bussing et al. | |
| 5,894,719 A | 4/1999 | Nalim et al. | |
| 5,916,125 A | 6/1999 | Snyder | |
| 6,003,301 A | 12/1999 | Bratkovich et al. | |
| 6,142,417 A | 11/2000 | Figge, Sr. | |

* cited by examiner

*Primary Examiner*—Ehud Gartenberg
(74) *Attorney, Agent, or Firm*—Woodward, Emhardt, Naughton, Moriarty & McNett LLP

(57) ABSTRACT

A propulsion module including a wave rotor detonation engine having a rotor with a plurality of fluid flow channels. The fluid flow channels extend between an inlet rotor plate, which has a pair of fixed inlet ports, and an outlet rotor plate, which has a pair of fixed outlet ports. The propulsion module includes a pair of inlet ducts have a stowed mode and a deployed mode. The pair of inlet ducts include a fluid flow passageway adapted to convey air to the pair of inlet ports. A fueling system is positioned prior to the inlet ports to deliver fuel into the air introduced through the pair of inlet ducts and into the pair of inlet ports. A pair of ignition chambers are disposed adjacent to the inlet rotor plate.

24 Claims, 3 Drawing Sheets

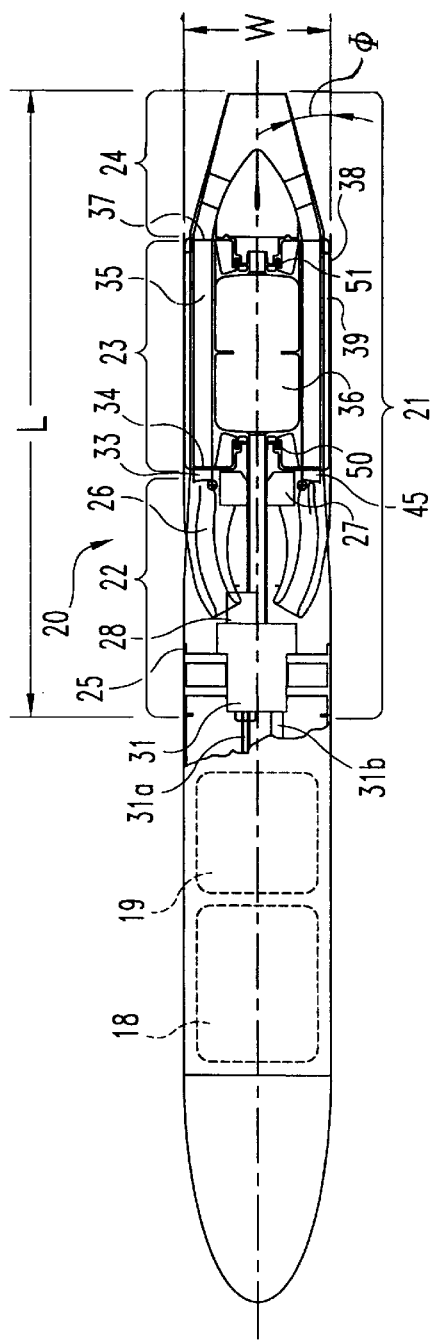
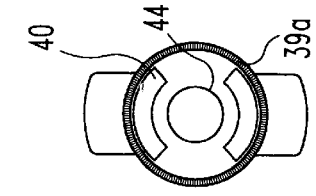
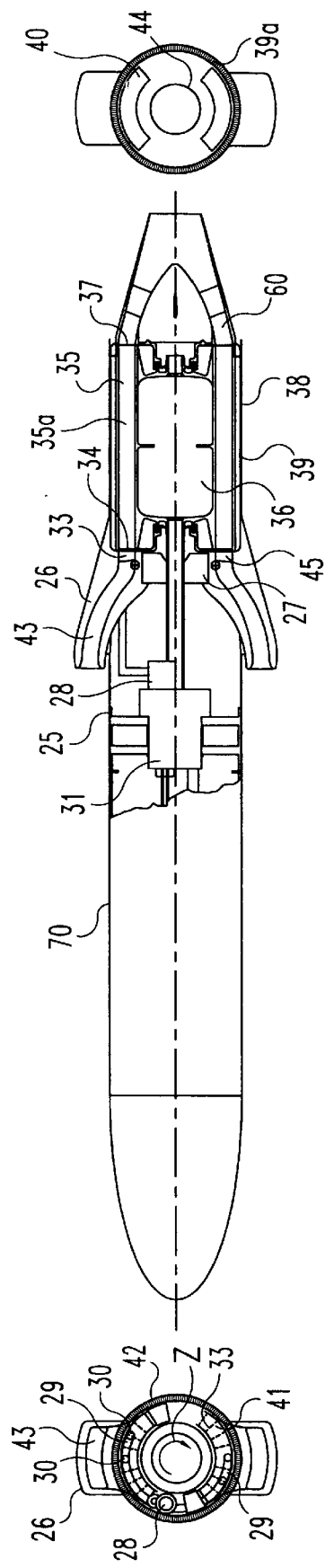
Fig. 1
Fig. 3
Fig. 2
Fig. 4

PROPULSION MODULE

REFERENCE TO RELATED APPLICATIONS

This application claims the benefit of U.S. Provisional Application Serial No. 60/175,808, filed Jan. 12, 2000, which is herein incorporated by reference.

BACKGROUND OF THE INVENTION

The present invention relates generally to propulsion systems, and more particularly, but not exclusively, relates to a propulsion system including a wave rotor detonation engine.

The demand for air vehicles that can fly faster farther and higher continues to push the capability of conventional turbomachinery and rockets. It is well recognized that many conventional engines cannot operate efficiently over the wide Mach number ranges and altitude ranges required for many applications. These applications include long-range and high-speed missiles, UAV's, and transatmospheric vehicles, with Mach number ranging from 0 to 10 and greater. Currently, turbojets perform well within range of about Mach 0 to Mach 3. An ideal air breathing engine for propulsion at Mach 3 to 6 is a simple ramjet, but its thrust drops sharply at lower speeds. Rockets are generally not speed limited, but their low specific impulse limits range and they lack throttle control for loitering.

One approach to achieve wide speed ranges using conventional technologies is to combine a ramjet with a rocket or turbine engine. The combined turbine engine and ramjet based system can provide high specific impulse at lower speeds, but the turbomachine becomes an obstacle and a burden at high-speed ramjet conditions. Alternatively, the combined rocket and ramjet system can provide high thrust loading at low speeds and at transatmospheric conditions, but involves an oxidant weight burden. Combined systems have not yet become economically feasible for several reasons, including the size, cost, and complexity of such combined systems.

Heretofore, there has been a need for an improved propulsion system. The present invention satisfies this need in a novel and nonobvious way.

SUMMARY OF THE INVENTION

One form of the present invention contemplates a propulsion module, comprising: a wave rotor detonation engine having a rotor with a plurality of fluid flow channels extending between an inlet rotor plate having a pair of fixed inlet ports and an outlet rotor plate having a pair of fixed outlet ports; a pair of inlet ducts having a stowed mode and a deployed mode, the pair of inlet ducts including a fluid flow passageway adapted for conveying air to the pair of inlet ports; a fueling system adapted to deliver a fuel into the air introduced through the pair of inlet ducts and into the pair of inlet ports; an exhaust nozzle disposed in fluid communication with the pair of outlet ports; and, at least one ignition chamber disposed adjacent the inlet rotor plate.

Another form of the present invention contemplates a propulsion module, comprising: a non-steady flow engine having at least a pair of inlet ports and at least a pair of outlet ports; an inlet duct having a stowed mode and a deployed mode, the inlet duct including a fluid flow passageway adapted for conveying air to the at least a pair of inlet ports a fueling system adapted to deliver a fuel into the air introduced through the inlet duct and into the at least a pair of inlet ports; an exhaust nozzle in fluid communication with the at least a pair of outlet ports; and, an ignition chamber disposed adjacent each of the at least a pair of inlet ports.

Another form of the present invention contemplates a missile, comprising: a body member having a front end and a nozzle end; a wave rotor detonation engine positioned substantially within the body member, the wave rotor detonation engine having a rotor with a plurality of fluid flow channels extending between an inlet rotor plate having a pair of fixed inlet ports and an outlet rotor plate having a pair of fixed outlet ports; a pair of inlet ducts having a stowed mode wherein the pair of inlet ducts are positioned substantially within the body member and a deployed mode wherein a portion of each of the pair of inlet ducts extend outwardly from the body member, the pair of inlet ducts including a fluid flow passageway adapted for conveying air to the pair of inlet ports; a fueling system adapted to deliver a fuel into the air introduced through the pair of inlet ducts and into the pair of inlet ports; an exhaust nozzle disposed in fluid communication with the pair of outlet ports; and at least one ignition chamber disposed adjacent the inlet rotor plate.

One object of the present invention is to provide a unique propulsion module.

Further objects, features, advantages, and aspects of the present invention shall become apparent from the detailed drawings and description contained herein.

BRIEF DESCRIPTION OF THE DRAWINGS

FIG. 1 shows an illustrative partial cross-sectional view of one embodiment of an air vehicle comprising an engine propulsion module of the present invention with a pair of inlet ducts in a stowed mode.

FIG. 2 shows the air vehicle of FIG. 1 with the pair of inlet ducts in the deployed mode.

FIG. 3 shows an illustrative cross-sectional view of an inlet portion of the engine propulsion module of FIG. 2.

FIG. 4 shows an illustrative cross-sectional view of an outlet section of the engine propulsion module of FIG. 2.

DESCRIPTION OF THE PREFERRED EMBODIMENTS

Figure 5:
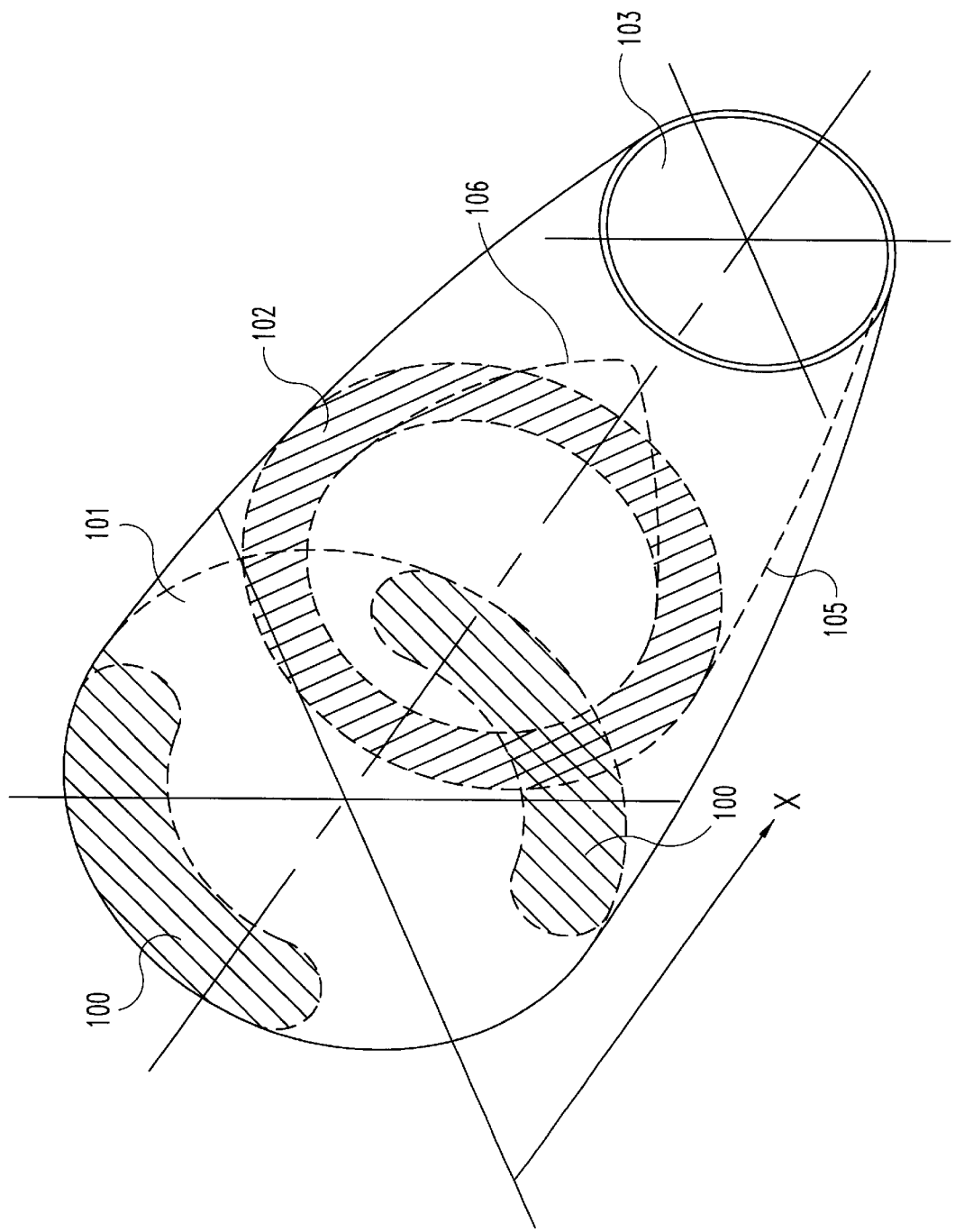
FIG. 5 is an illustrative view of one embodiment of the nozzle module of the present invention showing one form of the internal transformation from a pair of partial annular sectors to a full annular shape to a circular shape.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

With reference to FIGS. 1–4, there is illustrated an air vehicle 20 which includes a propulsion module 21, a fuel reservoir 19 and a payload 18 within a body 70. The term air vehicle includes, but is not limited herein, to missiles, supersonic missiles, subsonic missiles, UAV's, and transatmospheric vehicles. In one embodiment, the present invention defines an expendable subsonic missile. The present invention will be described hereafter with regards to a missile for convenience of the reader but the reader should appreciate that the present invention is not intended to be limited to a missile unless specifically stated.

The missile 20 is designed and constructed to carry a variety of payloads that would be known to a person of ordinary skill in the art. The present disclosure provides details related to the unique propulsion module 21, and will not describe other features of the missile. In one embodiment, the propulsion module 21 has an overall length "L" of about 66 inches and a maximum nominal propulsion module diameter of about 15 inches, and has a nominal thrust capacity of about 1000 pounds at sea level and a speed of about 0.45 Mach. Further, in many forms of the present invention the missile has a minimal frontal area. The present invention will be described in terms of an expendable subsonic missile utilizing a wave rotor detonation engine. A supersonic missile would include suitable supersonic inlet and nozzle configurations. The present invention is not limited to wave rotor detonation engines and it is contemplated that one form of the present invention can include other types of non-steady flow type engines, such as a pulse detonation engine. Further, the present invention is not limited to a propulsion module having the above quantitative characteristics, sizes, thrust capacity and it is understood that other propulsion modules having different physical characteristics are contemplated herein.

The propulsion module 21 includes an inlet module portion 22, a non-steady flow type engine module portion 23 and a nozzle module portion 24. In a preferred form of the present invention a wave rotor detonation engine module defines the non-steady flow type engine. The inlet module portion 22 includes a forward frame 25, a pair of pop-up inlet ducts 26, two igniter chambers 27, a combination fuel pump and fuel metering unit 28, a pair of fueling manifolds 29, and a series of fuel injection nozzles 30. The pair of pop-up inlet ducts 26 are shown in an inlet stowed mode in FIG. 1, and in an inlet deployed mode in FIG. 2. The inlet stowed mode is generally indicative of the state prior to the engine starting and the deployed mode is generally indicative of the state after engine starting. In the inlet deployed mode the inlet ducts 26 are positioned to capture free stream ram air into fluid flow passageways 43. In one embodiment the movement between the inlet stowed to the inlet deployed mode is accomplished with a stored energy inlet actuation system. Further, there is contemplated herein another form of the present invention wherein the inlets are located in a fixed position. However, other actuation systems are contemplated herein. The fluid flow passageways 43 are disposed in flow communication with a transition duct 45, which is in flow communication with the inlet ports of the wave rotor detonation engine 23.

The embodiment illustrated in FIGS. 1 and 2, include an auxiliary power system 31 for providing input power to the wave rotor 35a of the wave rotor detonation engine 23 during static and low speed operation. In another form of the present invention the propulsion module does not include an auxiliary power system to provide input power during static and low speed operation. The auxiliary power system 31 functions to turn the rotor 35a until a self-sustaining wave rotor rotational speed is reached from the inlet ram air flowing through the inlet ducts 26 to the rotor 35a. In one form, the auxiliary power system 31 is defined by a high speed DC motor/generator and a reduction drive. The DC motor/generator and reduction drive 31 is adapted to convert to a DC generator for supplying any electrical power needs to the missile 20 upon the rotor 35a reaching a self sustaining wave rotor rotational speed. In another form of the present invention there is only a DC motor which does not convert to a DC generator. The drive motor 31 is powered by a storage battery (not illustrated) until the rotor 35a attains the self sustaining wave rotor rotational speed. In an alternate embodiment utilized for an air launched missile, a drop-out ram air turbine generator is utilized for supplying engine electrical power needs.

The fuel pump and fuel metering unit 28 is coupled to the fuel reservoir 19 by a fuel inlet 31a, and in one embodiment the fuel pump 28 is driven by an output from the reduction drive. Further, in an alternate embodiment, the fuel pump 28 is electrically driven. A DC power inlet 31b is operably connected to the DC power source (not illustrated) to provide electrical power as required to the DC motor/generator 31, and any other equipment needing electrical power on the missile 20.

In one embodiment, the pair of pop-up inlet ducts 26 include substantially straight-in fluid flow passageways 43 that are connected in flow communication with the transition duct 45. The transition duct is in flow communication with the inlet ports formed in the wave rotor detonation engine inlet plate 34. In one form of the present invention, a plurality of inlet guide vanes 33 are positioned within the flow path and adapted to impart a tangential velocity component to the wave rotor channel 35 walls. In an alternate embodiment, the transition duct 45 could be scrolled or clocked in the direction of rotor rotation to impart a tangential impulse to the wave rotor 35a. The direction of rotor rotation is indicated by arrow 'Z' in FIG. 3. However, it is understood that in an alternate embodiment of the present invention the components are configured to allow the rotor to rotate in the opposite direction.

The wave rotor detonation engine includes the wave rotor detonation engine inlet plate 34 having the pair of inlet ports formed therein and disposed in flow communication with a pair of inlet sectors 41. In one form of the present invention, the inlet sectors 41 extend through about 108 degrees. It is understood that inlet sectors having other swept angles are contemplated herein. A rear wave rotor detonation engine exit plate 37 has a pair of exhaust ports formed therein that are in flow communication with a pair of outlet sectors 40. In one form of the present invention, the outlet sectors 40 extend through about 99 degrees. It is understood that outlet sectors having other swept angles are contemplated herein. Disposed between and rotatable relative to the wave rotor detonation engine endplates 34 and 37 is the rotor 35a which includes a plurality of wave rotor channels 35. In a preferred form, the wave rotor detonation engine fits within a substantially cylindrical space having a length of about 24 inches and a diameter not greater than 15 inches. However, wave rotor detonation engines requiring other envelope sizes are contemplated herein. In one embodiment, the wave rotor channels 35 include substantially straight sidewalls. However, in an alternate embodiment, the wave rotor channels 35 have been formed with a moderate twist to enhance the wind-milling power transfer from the fluid flow passing therethrough.

The fuel pump and metering unit 28 is in flow communication with a pair of fueling manifolds 29, and fuel injection nozzles 30. The fuel injection nozzles 30 are adapted to deliver an atomized fuel air mixture into the two inlet sectors 41. In one form of the present invention at least one ignition chamber is disposed adjacent the inlet plate 34 and an inlet sector 41. In a preferred form of the present invention a pair of ignition chambers 27 are disposed proximate to the inlet sectors 41 to initiate the detonation combustion process of the fuel air mixture within the plurality of wave rotor channels 35. However, it is understood that other quantities of ignition chambers are contemplated herein. In one form, the two ignition chambers 27 utilize a continuous hypergolic, fuel oxidizer jet, and in another embodiment the pair of ignition chambers 27 utilize a continuous high energy electrical igniter to initiate and enhance the detonation combustion process.

In one form, the plurality of rotor channels 35 are coupled to a hub 36 which is rotatably supported by a front and rear bearing assembly 50 and 51. Description of the specific parameters of a wave rotor detonation engine cycle will not be described herein as the present invention is not intended to be limited to a particular wave rotor detonation engine cycle. The selection of the particular wave rotor detonation engine will be based upon specific design perimeters. Information relating to wave rotor systems is set forth in literature such as AIAA-98-1614, entitled "Pulse Combustion and Wave Rotors for High Speed Propulsion Engines," by M. Razi Nalim and Kenol Jules, which is incorporated herein by reference.

In one form of the present invention, the wave rotor detonation engine module 23 includes an outer housing 38 spaced radially from the wave rotor 35*a*. In a preferred form the wave rotor includes 23 rotor channels. A ram air cooling passage 39 is defined between the inner surface of the outer case 38 and the outer surfaces of the plurality of wave rotor channels 35. The annular cooling passage 39 is coupled to and in fluid communication with an air inlet so as to enable the passage of ram air from outside of the missile 20. The ram air flowing within the ram air cooling passage 39 is designed to provide heat transfer from the wave rotor 35*a*. In one embodiment, the inlet ram air cooling passage includes a plurality of heat transfer members 39*a* positioned therein. In a more preferred form, the plurality of heat transfer members 39*a* define a plurality of cooling fins.

In one embodiment, the nozzle portion 24 for the subsonic air vehicle is a fixed throat area, conical convergent nozzle having an operating nozzle pressure ratio in the range of about 2.5 to about 3.0. In an effort to minimize external boat-tail drag, angle φ is preferably not greater than about 20 degrees and more preferably is within a range of about 15 to about 20 degrees. The pair of exhaust ports of the wave rotor detonation engine discharge the fluid flow through the pair of outlet sectors 40 (illustrated in FIG. 4). The fluid flow continues into the conical flow path 60. In one embodiment, an internal transition duct is utilized to control the area distribution in the annular conical passage in order to minimize exhaust total pressure dump loss and the corresponding thrust loss.

With reference to FIG. 5, there is an illustrative view of one embodiment of an internal transition duct 101 from the two partial annular sectors 100 to the full annular transformation station 102 and to the nozzle geometric throat area station 103. In a preferred form the nozzle geometric throat area station 103 is a substantially circular nozzle throat. The internal transition duct is utilized to control the area convergence distribution from the pair of outlet sectors to the throat of the convergent nozzle to reduce the partial dump loss in total pressure and thereby improve thrust performance. Further, illustrated in FIG. 5 is an internal wall member 105 which extends from the annular transformation station 102 to the nozzle geometric throat area station 103. The tail cone 106 has been shown in phantom lines positioned within the nozzle module portion.

Figure 6:
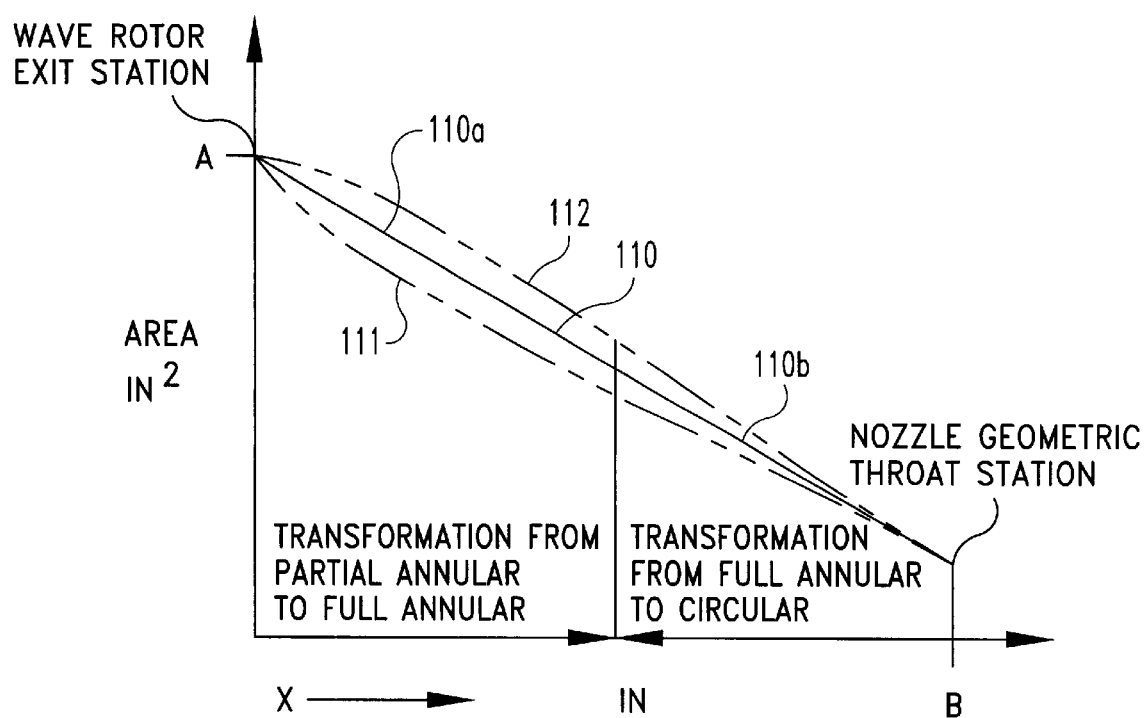
FIG. 6 is an unscaled illustrative chart indicating the change in internal flow area through the transition duct from a wave rotor detonation engine exit station to the nozzle throat station.

With reference to FIG. 6, there is illustrated an unscaled chart of the smoothly converging flow area of the internal transition duct 101 from the pair of partial annular sectors 100 at the outlet of the wave rotor detonation engine to the nozzle geometric throat station 103. A nominal curve for the converging flow area is depicted at 110 and acceptable range curves 111 and 112 define outer boundaries for the flow area transformation. The distance X is indicated from the wave rotor exit 100 towards the nozzle geometric throat area station 103. Portion 110*a* indicates the nominal curve related to the transformation from partial annular to full annular and portion 110*b* indicates the nominal curve related to transformation from full annular to circular. The present invention contemplates other nozzles and is not intended to be limited to the above internal transition duct unless specifically stated to the contrary.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. In reading the claims, it is intended that when words such as "a," "an," "at least one," or "at least a portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A propulsion module, comprising:
   a wave rotor detonation engine having a rotor with a plurality of fluid flow channels extending between an inlet rotor plate having a pair of fixed inlet ports and an outlet rotor plate having a pair of fixed outlet ports;
   at least one inlet duct having a stowed mode and a deployed mode, said at least one inlet duct including a fluid flow passageway adapted for conveying air to said pair of inlet ports;
   a fueling system adapted to deliver a fuel into the air introduced through said at least one inlet duct and into said pair of inlet ports;
   an exhaust nozzle disposed in fluid communication with said pair of outlet ports; and
   at least one ignition chamber disposed adjacent said inlet rotor plate.

2. The propulsion module of claim 1, which further includes an auxiliary power system to provide input power to turn said rotor during static and low air speed operation.

3. The propulsion module of claim 2, wherein said auxiliary power system includes a DC motor and a gear reduction drive.

4. The propulsion module of claim 3, which further includes a combination fuel pump and fuel metering unit coupled to said gear reduction drive.

5. The propulsion module of claim 2, wherein said propulsion system includes a DC motor and generator combination, and wherein said combination is operable as a generator upon the rotor reaching a self-sustaining speed.

6. The propulsion module of claim 1, which further includes a second duct connecting said at least one inlet duct to said plurality of fluid flow channels.

7. The propulsion module of claim 6, which further includes a plurality of inlet guide vanes within said second duct.

8. The propulsion module of claim 6, wherein each of said plurality of fluid flow channels is twisted to cause windmilling power transfer to said rotor.

9. The propulsion module of claim 1, which further includes a mechanical housing surrounding said rotor, and wherein a cooling passage adapted for the passage of a cooling media is defined between said mechanical housing and said plurality of fluid flow channels.

10. The propulsion module of claim 9, wherein said cooling passage has a plurality of heat transfer members provided therein.

11. The propulsion module of claim 9, wherein said cooling passage is in fluid communication with said at least one inlet duct.

12. The propulsion module of claim 1, which further includes an electrical power and accessory drive integration, and wherein the propulsion module has a minimal frontal area.

13. The propulsion module of claim 1, wherein said exhaust nozzle has an internal transition duct extending from said pair of outlet ports to a throat of said exhaust nozzle.

14. The propulsion module of claim 13, wherein said pair of outlet ports are adapted to discharge fluid through a pair of partial annular outlet sectors, and wherein said internal transition duct changes shape along it's length from said pair of partial annular outlet sectors to said throat.

15. The propulsion module of claim 14, wherein said transition duct converges the flowpath area to minimize total pressure losses and maximize thrust.

16. The propulsion module of claim 1, wherein a substantial portion of said fueling system is positioned prior to said pair of inlet ports.

17. The propulsion module of claim 1, wherein said exhaust nozzle has an external boattail portion tapered at an angle of not greater than 20 degrees.

18. The propulsion module of claim 1, wherein said exhaust nozzle has an external boattail portion tapered at an angle within a range of about 15 degrees to about 20 degrees.

19. The propulsion module of claim 1, which further includes a combination fuel pump and fuel metering unit adapted to feed fuel to said fueling system.

20. The propulsion module of claim 1, wherein said at least one ignition chamber is defined by a pair of ignition chambers.

21. A propulsion module, comprising:
a non-steady flow engine having at least a pair of inlet ports and at least a pair of outlet ports;
an inlet duct having a stowed mode and a deployed mode, said inlet duct including a fluid flow passageway adapted for conveying air to said at least a pair of inlet port;
a fueling system adapted to deliver a fuel into the air introduced through said inlet duct and into said at least a pair of inlet ports;
an exhaust nozzle in fluid communication with said at least a pair of outlet ports; and
an ignition chamber disposed adjacent each of said at least a pair of inlet ports.

22. The propulsion module of claim 21, wherein said non-steady flow engine includes a wave rotor detonation engine system.

23. The propulsion module of claim 21, wherein said non-steady flow engine includes a pulse detonation engine system.

24. A missile, comprising:
a body member having a front end and a nozzle end;
a wave rotor detonation engine positioned substantially within said body member, said wave rotor detonation engine having a rotor with a plurality of fluid flow channels extending between an inlet rotor plate having a pair of fixed inlet ports and an outlet rotor plate having a pair of fixed outlet ports;
at least one inlet duct having a stowed mode wherein said at least one inlet duct is positioned substantially within said body member and a deployed mode wherein a substantial portion of said at least one inlet duct extends outwardly from said body member, said at least one inlet duct including a fluid flow passageway adapted for conveying air to said pair of inlet ports;
a fueling system adapted to deliver a fuel into the air introduced through said at least one inlet duct and into said pair of inlet ports;
an exhaust nozzle disposed in fluid communication with said pair of outlet ports; and
at least one ignition chamber disposed adjacent said inlet rotor plate.

* * * * *

UNITED STATES PATENT AND TRADEMARK OFFICE
CERTIFICATE OF CORRECTION

PATENT NO.    : 6,584,764 B2
DATED         : July 1, 2003
INVENTOR(S)   : Von David Baker It is certified that error appears in the above-identified patent and that said Letters Patent is hereby corrected as shown below:

Column 6,
Lines 65-67, delete Claim 8 in its entirety.

Signed and Sealed this

Twenty-seventh Day of January, 2004

JON W. DUDAS
*Acting Director of the United States Patent and Trademark Office*